(12) United States Patent
Brydon et al.

(10) Patent No.: US 11,280,422 B1
(45) Date of Patent: Mar. 22, 2022

(54) EROSION RESISTANT PLUG AND SEAT VALVE

(71) Applicant: Flowserve Management Company, Irving, TX (US)

(72) Inventors: Christopher Brydon, Reno, NV (US); Patrick Ammon Hord, Highland, UT (US); Robert B. Carlson, Eagle Mountain, UT (US); Bradford B. Haines, Spanish Fork, UT (US); George Robertson, Spanish Fork, UT (US); Zachary Samuel Driskell, Spanish Fork, UT (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 17/121,113

(22) Filed: Dec. 14, 2020

(51) Int. Cl.
*F16K 1/38* (2006.01)
*F16K 25/00* (2006.01)

(52) U.S. Cl.
CPC .............. *F16K 25/005* (2013.01); *F16K 1/38* (2013.01)

(58) Field of Classification Search
CPC .................................. F16K 25/005; F16K 1/38
See application file for complete search history.

(56) References Cited

U.S. PATENT DOCUMENTS

| | | | | |
|---|---|---|---|---|
| 3,572,633 A | * | 3/1971 | Gaffney | F16K 1/487 251/356 |
| 8,944,408 B2 | | 2/2015 | Robison et al. | |
| 2001/0013587 A1 | * | 8/2001 | Robison | F16K 1/48 251/368 |
| 2007/0040136 A1 | * | 2/2007 | Caprera | F16K 1/482 251/122 |
| 2009/0049671 A1 | * | 2/2009 | O'Hara | F16K 1/48 29/213.1 |
| 2009/0302258 A1 | * | 12/2009 | Haines | F16K 1/482 251/309 |
| 2010/0140530 A1 | * | 6/2010 | Robison | F16K 25/005 251/368 |

(Continued)

FOREIGN PATENT DOCUMENTS

WO WO-2011019594 A1 * 2/2011 ........... C04B 37/005

OTHER PUBLICATIONS

Flowserve. "Valtek Survivor: Advanced Erosion Control for Slurry and Flashing Applications." Flowserve Corporation Irving, Texas. Aug. 2019. 8 Pages.

*Primary Examiner* — Marina A Tiet Jen
(74) *Attorney, Agent, or Firm* — Maine Cernota & Rardin

(57) ABSTRACT

A plug-and-seat valve plug head assembly that resists abrasive erosion includes a hardened plug head, such as a ceramic plug head, attached to a plug stem without any soldering, welding, or braising attachment to the plug head. A diameter of a second portion of the plug head smoothly increases according to a plug diameter profile. A diameter of a first portion of the plug head is everywhere smaller than the plug diameter profile, and is maximal at a location spaced apart from the second portion. A plug head retainer overlaps and closely conforms to the first portion, while presenting an exterior surface that smoothly continues and extends the plug diameter profile. In embodiments, a plug head retainer blank attaches to the plug head retainer, capturing the plug head therebetween. Embodiments apply radial and/or axial stress to the plug head.

12 Claims, 7 Drawing Sheets

(56) References Cited

U.S. PATENT DOCUMENTS

| | | | |
|---|---|---|---|
| 2012/0286183 A1* | 11/2012 | McCarty | F16K 1/36 |
| | | | 251/357 |
| 2013/0181155 A1* | 7/2013 | Robison | F16K 27/00 |
| | | | 251/324 |
| 2018/0149279 A1* | 5/2018 | Mann, III | F16K 1/36 |
| 2019/0063616 A1* | 2/2019 | Bin | F16K 1/10 |
| 2019/0101215 A1* | 4/2019 | Richardson | F16B 2/06 |
| 2020/0018422 A1* | 1/2020 | Weber | F16K 1/48 |

\* cited by examiner

EROSION RESISTANT PLUG AND SEAT VALVE

FIELD OF THE INVENTION

The invention relates to globe valves, and more particularly, to globe, angle, and sweep angle control valves that are subject to severe erosion due to particulate impacts. These valve types are referred to generically herein as "plug and seat" valves, indicating that a flow is being controlled between a plug and seat.

BACKGROUND OF THE INVENTION

Plug-and-seat valves are widely used for a variety of applications. With reference to FIG. 1A, a plug-and-seat valve assembly 118 controls fluid flow from an inlet 114 to an outlet 116 by actuating a plug assembly 110 such that a plug head 100 of the plug assembly 110 is moved closer to or further from a valve seat 112.

While plug-and-seat valves are readily adapted to many applications, special problems arise when implementing plug-and-seat valves in extreme operating environments, such as when controlling process fluids that are at elevated temperatures and/or pressures, and/or are corrosive. In addition, plug-and-seat valves can be subject to severe and rapid erosion when controlling the flow of a slurry that contains both solids and fluids. This erosion is intensified when the plug is near the seat, such that the slurry is forced to flow rapidly between, and in close contact with, the seat and plug. Under such conditions, in the region of the plug and seat, the slurry is generally flowing away from, or parallel to, the surfaces of the seat, while flowing generally toward, and applying pressure to, the plug. As such, it is the plug that is the primary victim of abrasive erosion when controlling the flow of a slurry that contains a high concentration of abrasive particulates.

For these and other reasons, plug-and-seat valves that are designed for implementation under extreme conditions generally implement a plug assembly that include a hardened plug head attached to a metal plug stem. One approach to attaching the plug head to the plug stem is by soldering, welding or brazing. This approach is suitable, for example, when attaching a tungsten carbide plug head to a plug stem. However, this approach is limited by temperature, size, and the choice of materials.

Furthermore, ceramic plug heads, such as plug heads comprised of sintered silicon carbide (SSiC), are often preferable to metals such as tungsten carbide for extreme operating environments involving highly erosive and/or corrosive fluids and/or slurries, due to the higher resistance of ceramics to corrosion and erosion. Because ceramics are generally not compatible with soldering, welding, or brazing, this approach generally requires attachment of the ceramic plug head to the plug stem by a retainer assembly that captures the shaped body of the ceramic plug head and holds it against the plug stem. An example of such a plug assembly 110 is shown in FIGS. 1A and 1B, in which a ceramic plug head 100 is attached to a plug stem 102 by a retainer assembly that comprises a plug head retainer 104 attached to a plug head blank 106, which in turn is attached to the plug stem 102.

The erosion of plug head by slurries can be further reduced by carefully configuring the outer profile shape of the plug head such that the contour of the plug head varies gradually and smoothly as the slurry flows past the plug head, thereby minimizing obstruction of the slurry and encouraging laminar flow of the slurry near the plug head. This approach can be successful in valves where the plug head is directly attached to the plug stem by soldering, welding, or brazing. However, this approach can be difficult to implement when the plug head 100, such as a ceramic plug head, is attached to the plug stem 102 by a retainer assembly 104, 106, as illustrated in FIGS. 1A and 1B. This is because the retainer assembly 104, 106 must encapsulate the plug head 100, and therefore some part 104 of the retainer assembly 104, 106 must extend beyond the plug head 100. In the example of FIGS. 1A and 1B, it can be seen that a region 108 of the plug head retainer 104 extends beyond the profile of the plug head 100, where it will be impacted and unduly eroded by particulates in a slurry.

What is needed, therefore, is a plug head assembly that includes a plug head, such as a ceramic plug head, that is attached to a plug stem by a retainer assembly, and in which the retainer assembly is not subject to undue erosion by particulates included in a process fluid slurry.

SUMMARY OF THE INVENTION

The present invention is a plug head assembly that includes a plug head, such as a ceramic plug head, that is attached to a plug stem by a retainer assembly, and in which the retainer assembly is not subject to undue erosion by particulates included in a process fluid slurry.

The plug head of the present invention is axially symmetric about a plug head axis, and includes a proximal first portion and a distal second portion, wherein the second portion has a diameter that smoothly increases axially from a distal end thereof to a proximal end thereof according to a plug diameter profile that is configured to minimize obstruction of the slurry and encourage laminar flow of the slurry near the plug head.

The diameter of the first portion of the plug head also varies, but is everywhere less than the plug diameter profile. Furthermore, the diameter of the first portion reaches a maximum at a location that is axially proximal to the juncture between the second portion and the first portion.

The proximal first portion of the plug head is surrounded by a plug head retainer of the retainer assembly. The plug head retainer has an interior diameter that conforms closely to the outer diameter of the first portion of the plug head, and an outer diameter that extends the plug diameter profile of the plug head, so that the process fluid transitions smoothly from the second portion of the plug head to the plug head retainer with minimal erosion of the plug head retainer. Because the diameter of the first portion reaches a maximum at a location that is axially proximal to the juncture between the second portion and the first portion, the plug head is constrained from axial movement in a distal direction relative to the plug head retainer.

In embodiments, the retainer assembly further includes a plug head blank that abuts a proximal face of the plug head and attaches to the plug head retainer, thereby capturing the plug head between the plug head retainer and the plug head blank. In various embodiments, fasteners such as pins or bolts are used to attach the plug head retainer to the plug head blank and/or to attach the retainer assembly to the plug stem.

In embodiments, the plug head retainer is configured to apply a radial compressive stress to the plug head, and in some embodiments the retainer assembly is configured to apply an axial compressive stress to the plug head.

A first general aspect of the present invention is a plug head assembly configured for implementation in a plug-andseat valve. The plug head assembly includes a plug head that is axially symmetric about a plug head assembly axis, the plug head having a proximal first portion and a distal second portion, wherein the second portion has a second portion diameter that increases smoothly in a proximal direction from a distal end thereof according to a plug diameter profile, the first portion having a first portion diameter that is everywhere less than the plug diameter profile, and which reaches a maximum at a location that is proximally spaced apart from the second portion.

The plug head assembly further includes a plug stem centered along the plug head assembly axis, and a plug head retainer assembly comprising one or more retainer elements, the plug stem being proximally attached to the plug head retainer assembly, at least one of the retainer elements surrounding and capturing the first portion of the plug head while the second portion of the plug head extends distally beyond the retainer assembly, the plug head being thereby fixed to the plug stem by the plug head retainer assembly, the plug head retainer assembly and plug stem being thereby attached to the plug head without welding or adhesion of any element of the plug head retainer assembly or plug stem to the plug head, and wherein an outer surface of the plug head retainer assembly conforms with and extends the plug diameter profile of the plug head proximally of the second portion of the plug head.

In embodiments, the plug head is made of a ceramic.

In any of the above embodiments, the plug head retainer assembly elements can comprise a plug head retainer and a plug head blank configured for attachment to the plug head retainer, said plug head being captured therebetween, and wherein an outer surface of the plug head retainer conforms with and extends the plug diameter profile of the plug head.

In any of the above embodiments, the plug head retainer assembly can be configured to apply radially compressive stress to the plug head.

In any of the above embodiments, the plug head retainer assembly can be configured to apply axially compressive stress to the plug head.

And in any of the above embodiments, the plug diameter profile of the plug head can be configured to provide equal percentage characteristics to the plug head assembly, or linear characteristics to the plug head assembly.

A second general aspect of the present invention is a plug-and-seat valve suitable for controlling a flow of a slurry containing a high concentration of abrasive particulates, the plug-and-seat valve comprising a plug assembly according to the first general aspect, a valve seat, and a housing, the plug assembly being configured for translation within the housing toward and away from the valve seat.

In embodiments of the second general aspect, the plug head is made of a ceramic.

In any of the above embodiments of the second general aspect, the plug head retainer assembly elements can comprise a plug head retainer and a plug head blank configured for attachment to the plug head retainer, said plug head being captured therebetween, and wherein an outer surface of the plug head retainer conforms with and extends the plug diameter profile of the plug head.

In any of the above embodiments of the second general aspect, the plug head retainer assembly can be configured to apply radially compressive stress to the plug head.

In any of the above embodiments of the second general aspect, the plug head retainer assembly can be configured to apply axially compressive stress to the plug head.

And in any of the above embodiments of the second general aspect, the plug diameter profile of the plug head can be configured to provide equal percentage characteristics to the plug head assembly, or linear characteristics to the plug head assembly.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
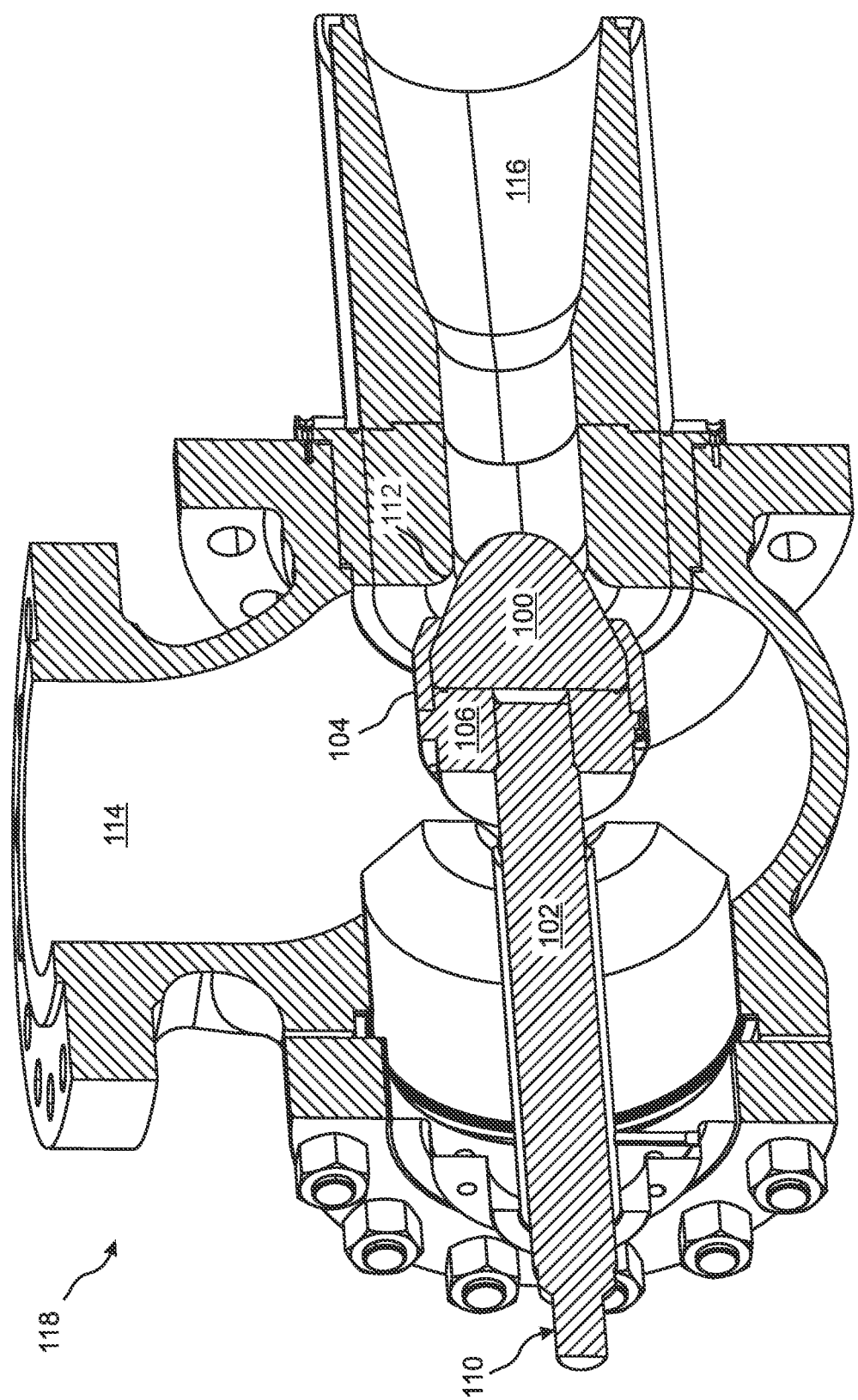
FIG. 1A is a perspective sectional view of a prior art plug-and-seat valve configured for controlling the flow of an abrasive slurry.
Figure 2A:
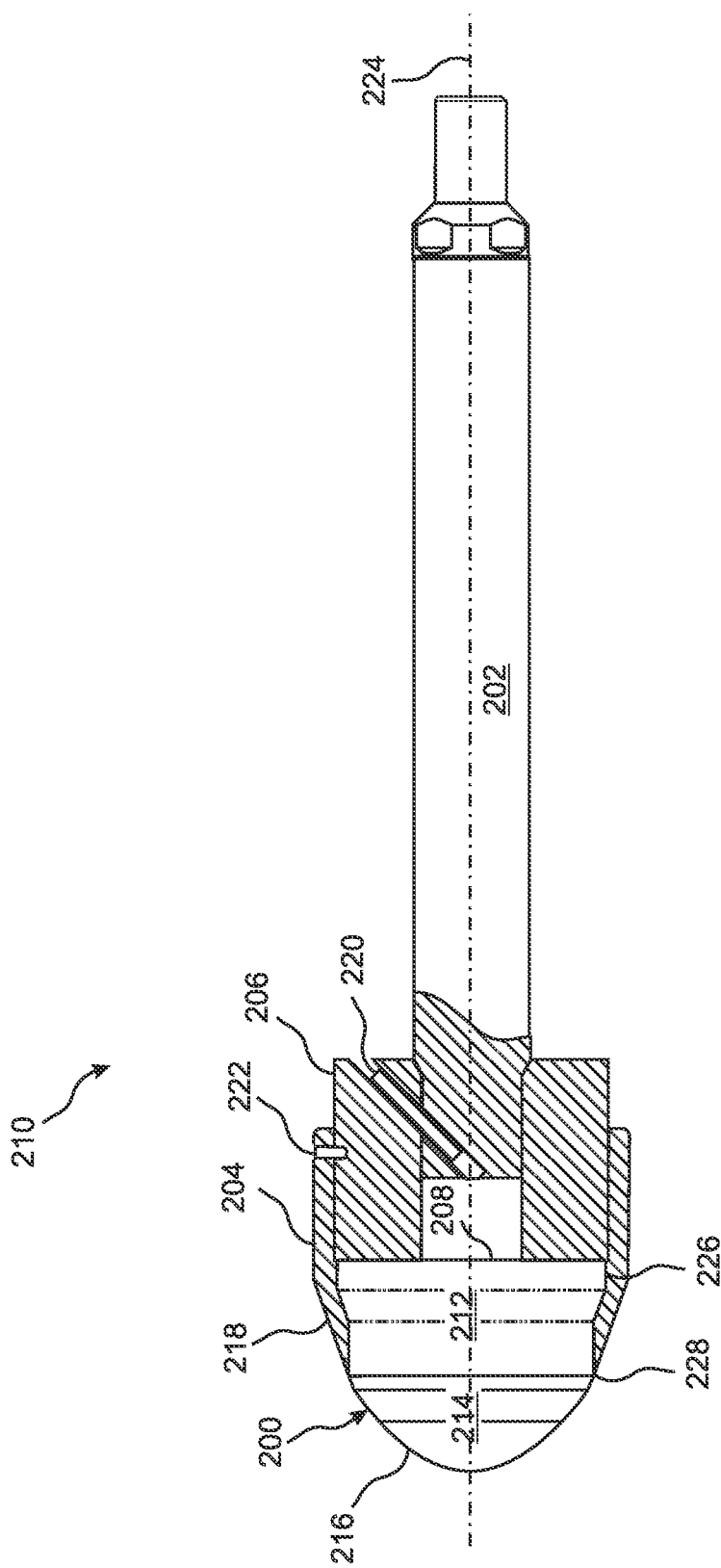
FIG. 2A is a side cross sectional view, drawn to scale, of a plug head assembly according to an embodiment of the present invention.
Figure 2B:
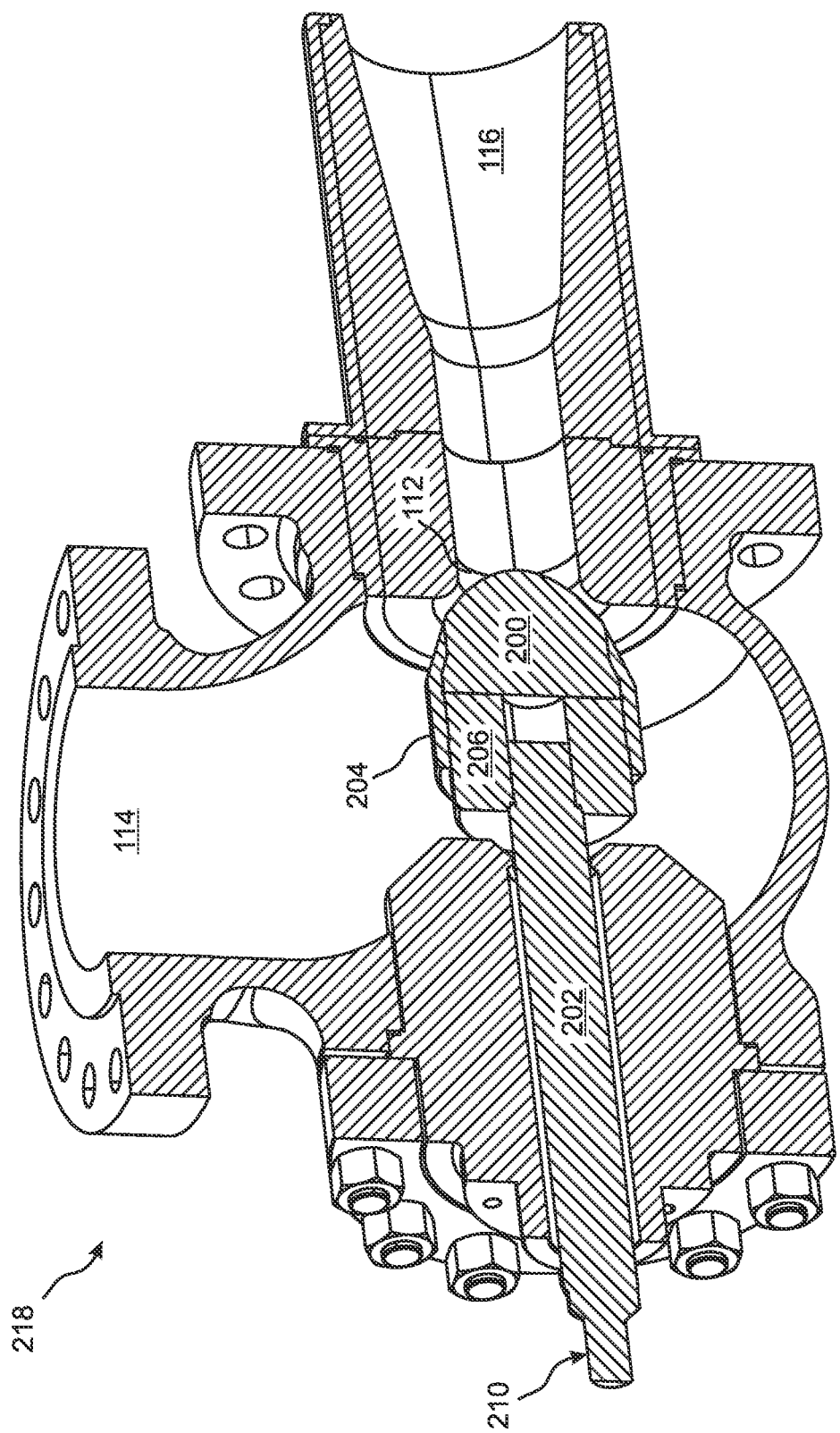
FIG. 2B is a perspective sectional view, drawn to scale, showing the plug head assembly of FIG. 2A implemented in a valve similar to FIG. 1A.

With reference to FIGS. 2A and 2B, the present invention is a plug assembly 210 that includes a plug head 200, such as a ceramic plug head 200, that is attached to a plug stem 202 by a retainer assembly 204, 206, where the retainer assembly is not subject to undue erosion by particulates included in a process fluid slurry. FIG. 2A presents a cross-sectional side view of the plug assembly 210 shown separately, while FIG. 2B is a cross-sectional, perspective view showing the plug assembly 210 installed in a plug-and-seat valve 218 similar to the valve 118 of FIG. 1A.

The plug head 200 of the present invention is axially symmetric about a plug head axis 224, and includes a proximal first portion 212 and a distal second portion 214, wherein the second portion 214 has a diameter that smoothly increases axially from a distal end thereof to a proximal end thereof according to a plug diameter profile 216 that is configured to minimize obstruction of the slurry and encourage laminar flow of the slurry near the plug head 200.

The diameter of the first portion 212 of the plug head 200 varies, but is everywhere less than the plug diameter profile 216. Furthermore, the diameter of the first portion 212 reaches a maximum 226 at a location that is axially offset from the juncture 228 between the first portion 212 and the second portion 214. In the embodiment of FIGS. 2A and 2B, the first portion 212 of the plug head 200 reaches a maximum diameter 216 at a proximal end 208 thereof.

The proximal first portion 216 of the plug head 200 is surrounded by a plug head retainer 204 of the retainer assembly. The plug head retainer 204 has an interior diameter that conforms closely to the outer diameter of the first portion 212 of the plug head, and an outer diameter 218 that extends the plug diameter profile 216 of the second portion 214 of the plug head 200, so that the process fluid transitions smoothly from the outer surface of the plug head retainer 204 to the outer surface of the first portion 212 of the plug head 200, with minimal intrusion of the plug head 200 and plug head retainer 204 into the flow path of the slurry, and thereby with minimal erosion of the plug head 200 and plug head retainer 204. Because the diameter of the first portion 212 reaches a maximum 226 at a location that is axially offset from the juncture 228 between the first portion 212 and the second portion 214, the plug head 200 is constrained from axial movement in a distal direction relative to the plug head retainer 204.

In the embodiment of FIGS. 2A and 2B, the retainer assembly further includes a plug head blank 206 that abuts a proximal face 208 of the first portion 212 of the plug head 200, and attaches to the plug head retainer 204, thereby capturing the plug head 200 between the plug head retainer 204 and the plug head blank 206, so that the plug head 200 is constrained from axial movement in a proximal direction relative to the retainer assembly.

In the embodiment of FIGS. 2A and 2B, the plug head retainer 204 is attached to the plug head blank 206 by a first threaded engagement, and restrained from rotation by a first pin 222, while the plug head blank 206 is attached to the plug stem 202 by a second threaded engagement, and constrained from rotation by a second pin 220. In other embodiments, attachment of the plug head retainer 204 to the plug head blank 206 and/or attachment of the plug head blank to the plug stem 202 can by bolts, welding, soldering, brazing, or by any other attachment means known in the art.

In embodiments, the plug head retainer 204 is configured to apply a radial compressive stress to the plug head 200.

In the embodiment of FIGS. 2A and 2B, axial compressive stress is applied to the plug head 200 by compressing it axially between the plug head retainer 204 and the plug head blank 206.

Figure 1B:
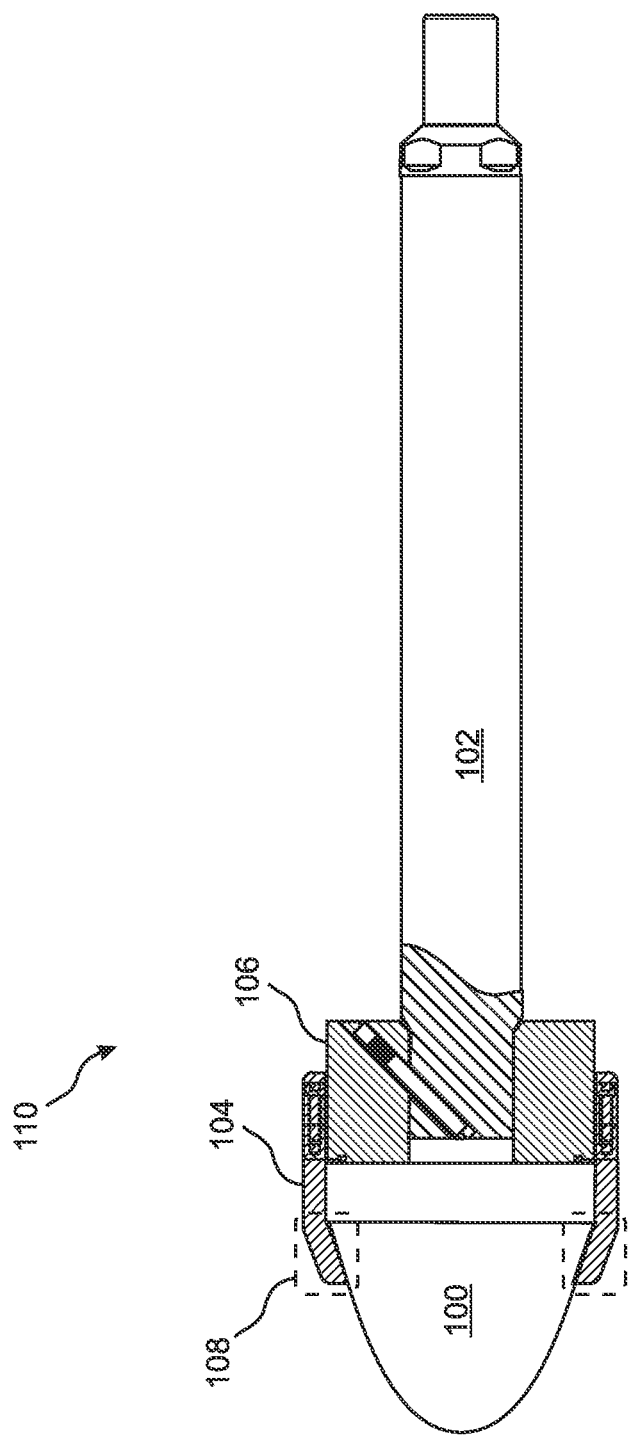
FIG. 1B is a side cross sectional view of the plug head assembly of FIG. 1A.
Figure 3:
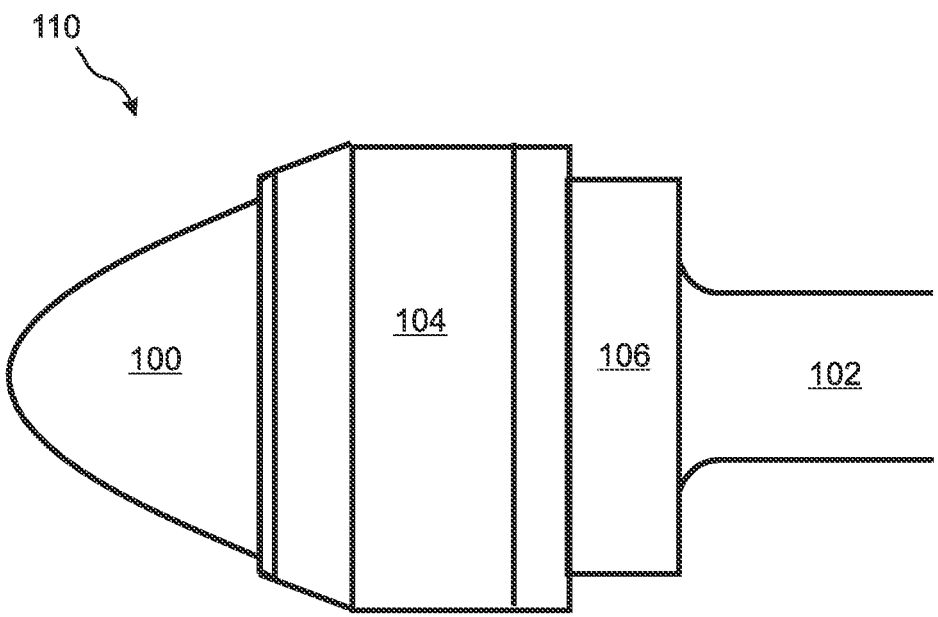
FIG. 3 is a side view drawn to scale that compares the plug diameter profiles of the prior art plug head assembly of FIG. 1B and the plug head assembly embodiment of FIG. 2A.
Figure 3:
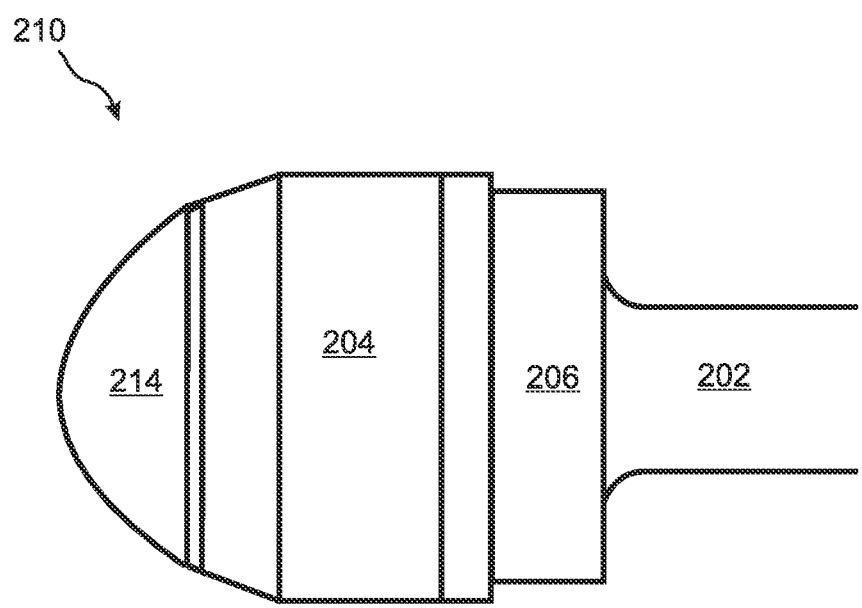

FIG. 3 presents a side-view comparison of the plug diameter profiles of the plug head regions of the prior art design of FIGS. 1A and 1B with the embodiment of the present invention illustrated by FIGS. 2A and 2B.

Figure 4:
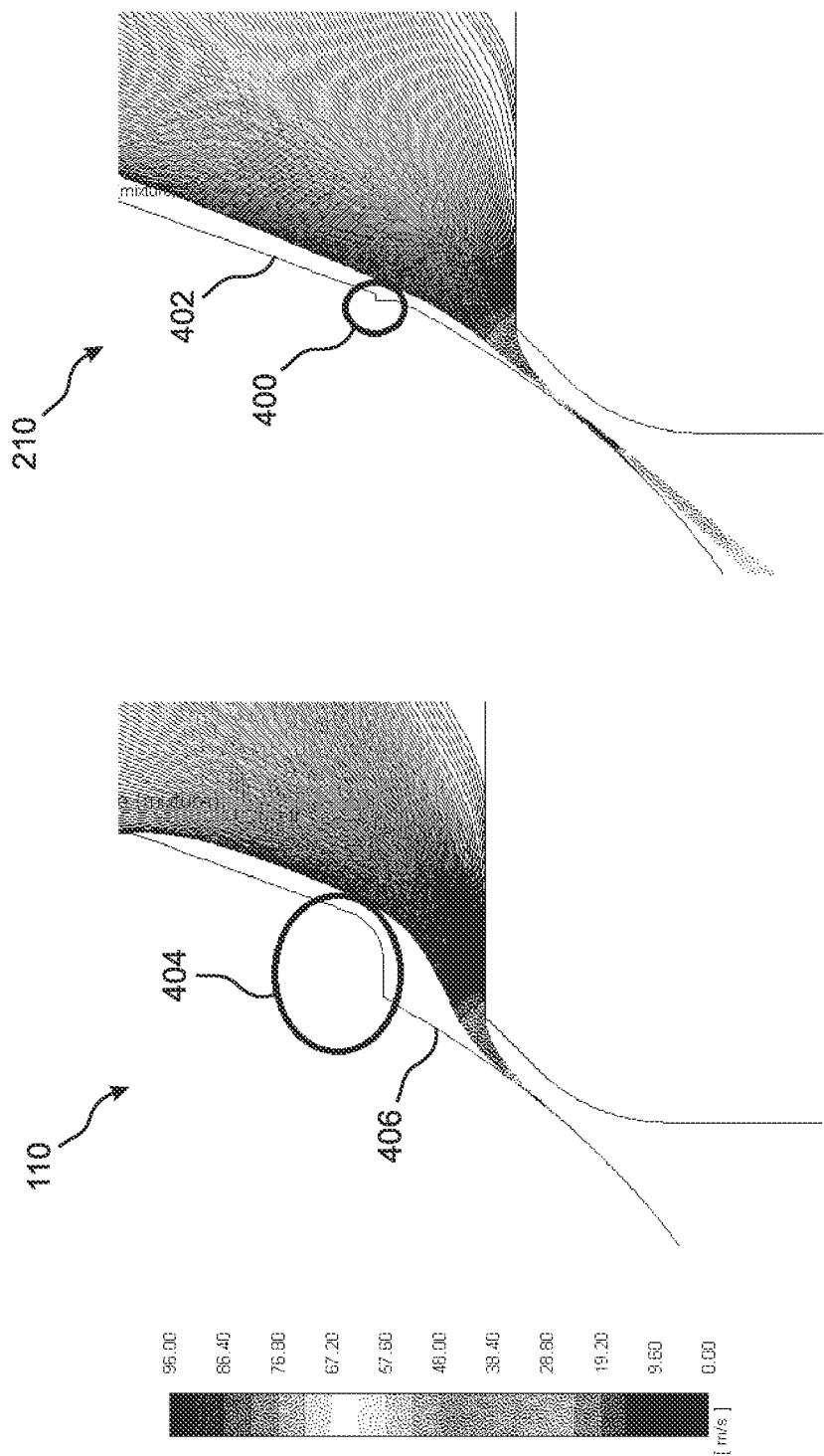
FIG. 4 compares directional changes in the flow patterns around the plug diameter profiles of FIG. 3.
Figure 5:
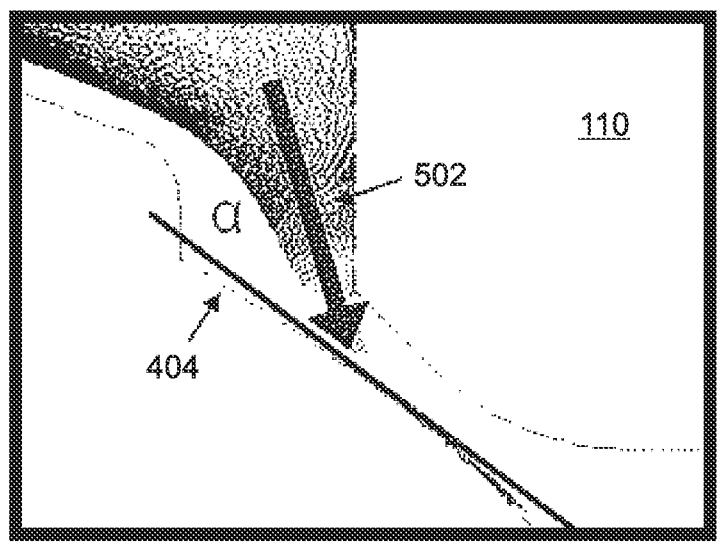
FIG. 5 compares impact angles of process fluid flow around the plug diameter profiles of FIG. 3.
Figure 5:
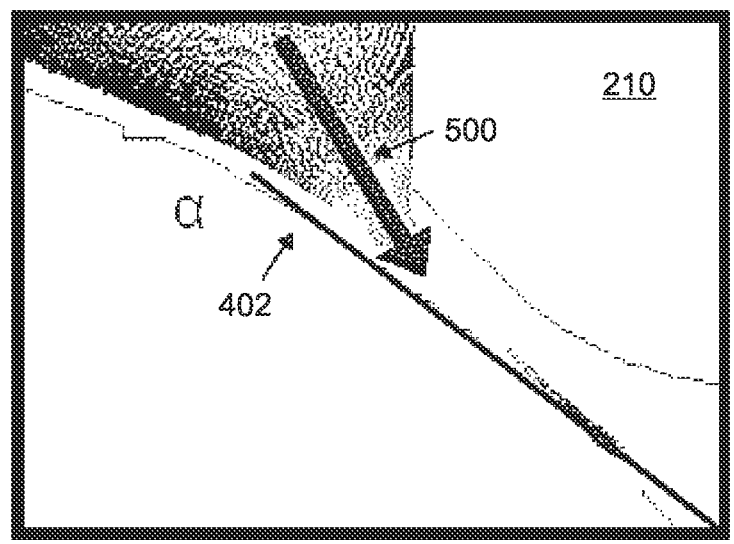

FIGS. 4 and 5 present comparisons of flow pattern directional changes and impact angles of a fluid as it flows past the plug head assemblies 110, 210 shown in FIG. 3, i.e. the plug head 100 and plug head retainer 104 of the prior art design of FIGS. 1A and 1B as compared with the plug head 200 and plug head retainer 204 of FIGS. 2A and 2B. It can clearly be seen in FIG. 4 that directional changes 400 in the flow patterns 402 around the plug head 200 of the embodiment 210 of FIGS. 2A and 2B are significantly reduced, as compared to the directional changes 404 in the flow pattern 406 of the prior art example 110 of FIGS. 1A and 1B.

Similarly, it can clearly be seen in FIG. 5 that the impact angle 500 of the embodiment 210 of FIG. 2 is significantly reduced as compared to the impact angle 502 of the prior art example 110 of FIG. 1.

It should be noted that the plug diameter profile 216 of the plug head 200 of the present invention can be configured according to the requirements of various instantiations. For example, the plug diameter profile of the plug head 200 can be configured to provide equal percentage plug head characteristics or linear plug head characteristics, according to the specific requirements of each instantiation of the invention.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A plug head assembly configured for implementation in a plug-and-seat valve, the plug head assembly comprising:
   a plug head that is axially symmetric about a plug head assembly axis, the plug head having a proximal first portion and a distal second portion, wherein the second portion has a second portion diameter that increases smoothly in a proximal direction from a distal end thereof to a proximal end thereof according to a plug diameter profile, the first portion having a first portion diameter that is everywhere less than the plug diameter profile and everywhere equal to or greater than a diameter of the proximal end of the second portion, and which reaches a maximum at a location that is proximally spaced apart from the proximal end of the second portion;
   a plug stem centered along the plug head assembly axis; and
   a plug head retainer assembly, the plug stem being proximally attached to the plug head retainer assembly, the plug head retainer assembly comprising:
      a unitary plug head retainer completely surrounding and capturing the first portion of the plug head while the second portion of the plug head extends distally beyond the plug head retainer and
      a unitary plug head blank completely surrounding the plug head assembly axis, the plug head blank being attached to the plug stem and being removably attached to the plug head retainer, said plug head being captured between the plug head blank and the plug head retainer, the plug head being thereby fixed to the plug stem by the plug head retainer assembly;
   the plug head retainer assembly and plug stem being thereby attached to the plug head without welding or adhesion of any element of the plug head retainer assembly or plug stem to the plug head; and
   wherein an outer surface of the plug head retainer assembly conforms with and extends the plug diameter profile of the plug head proximally of the second portion of the plug head.

2. The plug head assembly of claim 1, wherein the plug head is made of a ceramic.

3. The plug head assembly of claim 1, wherein the plug head retainer assembly is configured to apply radially compressive stress to the plug head.

4. The plug head assembly of claim 1, wherein the plug head retainer assembly is configured to apply axially compressive stress to the plug head.

5. The plug head assembly of claim 1, wherein the plug diameter profile of the plug head is configured to provide equal percentage characteristics to the plug head assembly.

6. The plug head assembly of claim 1, wherein the plug diameter profile of the plug head is configured to provide linear characteristics to the plug head assembly.

7. A plug-and-seat valve suitable for controlling a flow of a slurry containing a high concentration of abrasive particulates, the plug-and-seat valve comprising:
   a plug assembly according to claim 1;
   a valve seat; and
   a housing;
   the plug assembly being configured for translation within the housing toward and away from the valve seat.

8. The plug-and-seat valve of claim 7, wherein the plug head is made of a ceramic.

9. The plug-and-seat valve of claim 7, wherein the plug head retainer assembly is configured to apply radially compressive stress to the plug head.

10. The plug-and-seat valve of claim 7, wherein the plug head retainer assembly is configured to apply axially compressive stress to the plug head.

11. The plug-and-seat valve of claim 7, wherein the plug diameter profile of the plug head is configured to provide equal percentage characteristics to the plug head assembly.

12. The plug-and-seat valve of claim 7, wherein the plug diameter profile of the plug head is configured to provide linear characteristics to the plug head assembly.

\* \* \* \* \*